(12) United States Patent
Gibbs et al.

(10) Patent No.: US 10,131,194 B2
(45) Date of Patent: *Nov. 20, 2018

(54) AMPHIBIAN HULL

(71) Applicant: Gibbs Technologies Limited, Warwickshire (GB)

(72) Inventors: Alan Timothy Gibbs, London (GB); Eric John Carlson, Howell, MI (US)

(73) Assignee: Gibbs Technologies Limited, Warwickshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/230,001

(22) Filed: Aug. 5, 2016

(65) Prior Publication Data

US 2017/0028801 A1 Feb. 2, 2017

Related U.S. Application Data

(63) Continuation of application No. 14/126,011, filed as application No. PCT/GB2012/051344 on Jun. 13, 2012, now Pat. No. 9,415,649.

(Continued)

(51) Int. Cl.
*B60F 3/00* (2006.01)
*B63H 1/14* (2006.01)
*B63H 11/00* (2006.01)

(52) U.S. Cl.
CPC ............ *B60F 3/0015* (2013.01); *B60F 3/003* (2013.01); *B60F 3/0038* (2013.01); *B63H 1/14* (2013.01); *B63H 11/00* (2013.01); *B60F 2301/04* (2013.01)

(58) Field of Classification Search
CPC ...... B60F 3/0015; B60F 3/0038; B60F 3/003; B63H 11/00; B63H 1/14
(Continued)

(56) References Cited

U.S. PATENT DOCUMENTS 2,400,132 A 5/1946 Porter
3,280,785 A 10/1966 Mycroft
(Continued)

FOREIGN PATENT DOCUMENTS

GB 2401832 11/2004
GB 2401833 11/2004
(Continued)

OTHER PUBLICATIONS

Photographs of Remote Control Toy Publicly Available prior to Apr. 12, 2013.

*Primary Examiner* — Stephen P Avila
(74) *Attorney, Agent, or Firm* — Price Heneveld LLP

(57) ABSTRACT

An amphibian operable in land and marine modes includes a hull, having a discontinuity, and a retractable wheel or track drive assembly at least partially located in the discontinuity. A wheel or track drive of the at least one retractable wheel or track drive assembly is retracted above a lowest point of the hull when operating in marine mode, and the wheel or track drive is protracted below the lowest point when operating in land mode. The hull is a planing V hull having a forward bow section defining a frontal bow surface/area across a beam of the hull. The discontinuity is provided in the forward bow section, and the wheel or track drive of the retractable wheel or track drive assembly is located ahead of and in front of at least a portion of the frontal bow area when protracted.

18 Claims, 11 Drawing Sheets

Related U.S. Application Data

(60) Provisional application No. 61/496,297, filed on Jun. 13, 2011.

(58) Field of Classification Search
USPC ........................................... 114/12.5
See application file for complete search history.

(56) References Cited

U.S. PATENT DOCUMENTS

| | | | |
|---|---|---|---|
| 3,421,472 A | 1/1969 | Oberg et al. |
| 4,387,661 A | 6/1983 | Duff |
| 4,718,501 A | 1/1988 | Lawler |
| 4,744,324 A | 5/1988 | Martinmaas |
| 4,958,584 A | 9/1990 | Williamson |
| 5,590,617 A | 1/1997 | Aquastrada |
| 5,607,332 A | 3/1997 | Yamaha |
| 5,690,046 A | 11/1997 | Grzech |
| 6,182,784 B1 | 2/2001 | Pestotnik |
| 6,505,694 B2 | 1/2003 | Maguire |
| 6,540,569 B1 | 4/2003 | Gong |
| 6,672,916 B1 | 1/2004 | Lent-Phillips et al. |
| 7,311,567 B2 | 12/2007 | Gibbs |
| 7,316,594 B2 | 1/2008 | Gibbs |
| 7,758,392 B2 | 7/2010 | Gibbs |
| 9,415,649 B2 * | 8/2016 | Gibbs |
| 2004/0032120 A1 | 2/2004 | Vaisanen et al. |
| 2004/0154513 A1 | 8/2004 | Matsuda |
| 2007/0249241 A1 | 10/2007 | Mott |
| 2008/0026650 A1 * | 1/2008 | Roycroft ............... B60F 3/0038 440/12.5 |
| 2009/0061702 A1 | 3/2009 | March |

FOREIGN PATENT DOCUMENTS

| | | |
|---|---|---|
| JP | H02124308 A | 5/1990 |
| JP | H0463709 A | 2/1992 |
| JP | H11157483 A | 6/1999 |
| LU | 84437 | 5/1984 |
| RU | 2297922 C2 | 4/2007 |
| RU | 64140 U1 | 6/2007 |
| WO | 2004020228 A1 | 3/2004 |
| WO | 2005115775 A1 | 12/2005 |
| WO | 2006040563 A1 | 4/2006 |
| WO | 2006043043 A1 | 4/2006 |
| WO | 2006043071 A1 | 4/2006 |
| WO | 2006043088 A1 | 4/2006 |
| WO | 2006056803 A1 | 6/2006 |
| WO | 2006056805 A1 | 6/2006 |
| WO | 2007045909 A2 | 4/2007 |
| WO | 2008023191 A2 | 2/2008 |
| WO | 2009027646 A1 | 3/2009 |
| WO | 2009027647 A1 | 3/2009 |
| WO | 2009027661 A1 | 3/2009 |
| WO | 2009153561 A1 | 12/2009 |
| WO | 2011077090 A2 | 6/2011 |

* cited by examiner

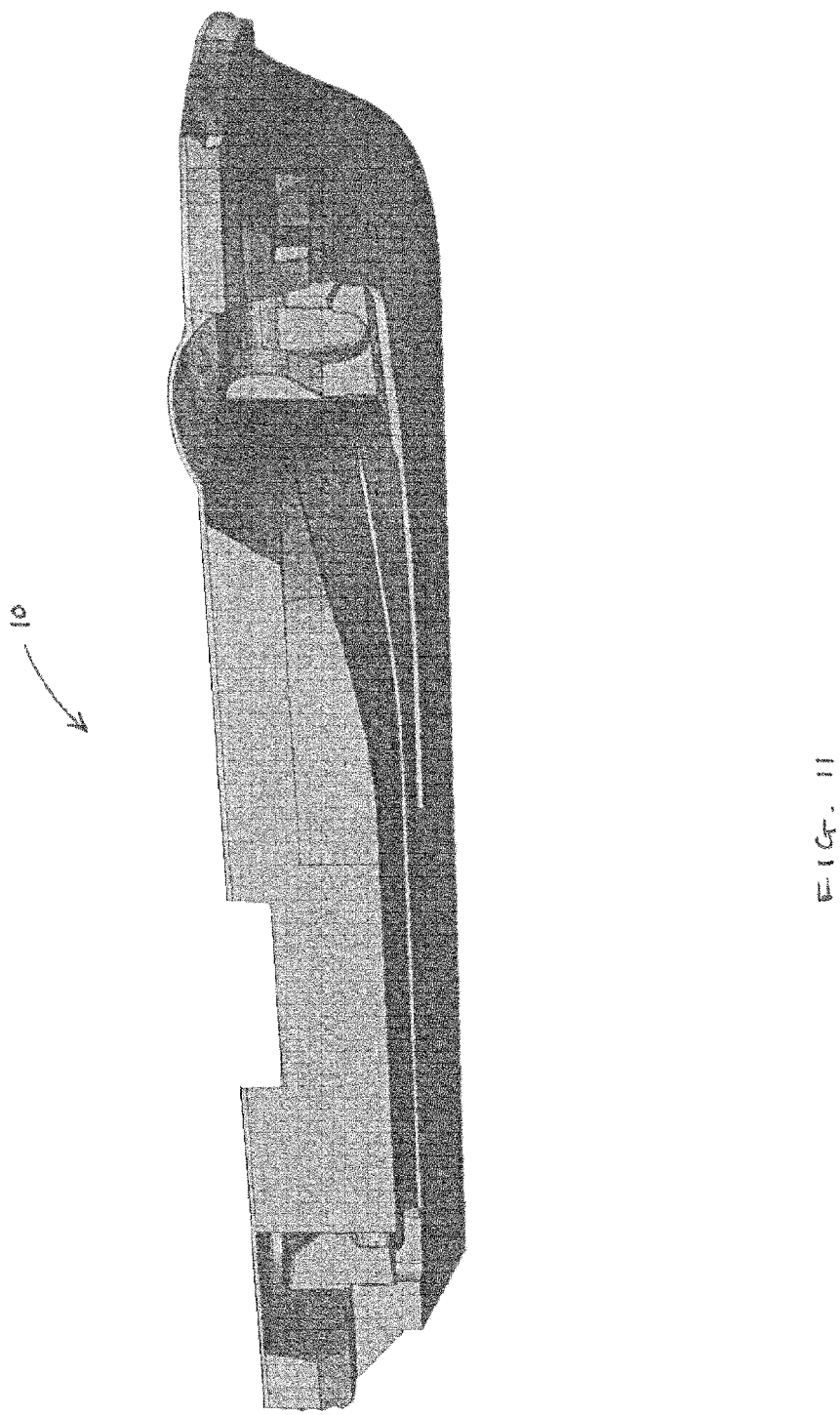

AMPHIBIAN HULL

BACKGROUND OF THE INVENTION

The present invention relates to an amphibian hull and, in particular, to a high speed amphibian hull.

In the past, designers of amphibians have focused their efforts on optimizing either on-water or on-land performance. As a result, either on-water performance has been sacrificed in order to give satisfactory on-land performance, or on-land performance sacrificed to give satisfactory on-water performance. The resulting amphibians are compromised to one degree or another.

To enable an amphibian to attain greater speed on water, it is desirable for the amphibian to be provided with a planing hull. Such a hull can be powered from standing where it is fully displaced to a speed where it can generate sufficient hydrodynamic lift to rise up out of the water and plane across the surface of the water.

Generally, for optimal performance, the surface of a planing hull should contain as few discontinuities as possible, as disruptions to the surface of the hull will increase drag and compromise both the hydrodynamic lift achievable and handling on water. However, the nature of an amphibian is such that it can require the surface of the hull to contain discontinuities, such as recesses within which components, for example, wheel and suspension assemblies, are located. When attempting to optimize on-water performance, designers of amphibians with retractable wheel and suspension assemblies have expended great effort in providing movable cover mechanisms for wheel arch cut outs to re-establish the smooth uninterrupted lines of a conventional marine hull when the wheels are retracted. Movable covers and plates are known in amphibians, for example from U.S. Pat. No. 4,958,584 (Williamson), U.S. Pat. No. 3,421,472 (Oberg), and U.S. Pat. No. 3,280,785 (Oberg). The sliding and/or hinging mechanisms of movable covers or plates are liable to seize up through corrosion, and/or through ingress of mud, sand, silt, salt, or other marine debris. They may also be damaged through collision with objects such as rocks during vehicle mode conversion or off-road use. An amphibious vehicle which cannot change mode may be immobilized; either on land, or even worse, on water. Furthermore, the necessity of maintaining and scrupulously cleaning sliding and/or hinging mechanisms may not likely be acceptable to the vehicle owner, who will be accustomed to the less onerous demands of modern cars and boats. Although movable covers or plates have been proposed in several amphibians patents as noted above, these have not made it to series production.

Furthermore, the designers of planing hulls for watercraft usually adopt a dead rise angle of between 10 and 25 degrees. However, to date, designers of amphibians have found it desirable to reduce as far as possible the dead rise angle in order to provide for adequate ground clearance when an amphibian is used on land. Such a low dead rise angle can detrimentally affect the ride of the hull when planing on water.

In addressing the above problems in the more recent past, the applicant has retained wheel arches in the hull but developed hydrodynamic aids such as planing plates to help recover at least part of the hull form (as disclosed in the applicant's UK patent no. GB2401832B) and strakes to improve directional stability of the hull when on the plane (as disclosed in the applicant's UK patent no. GB2401833B).

SUMMARY OF THE INVENTION

The applicant has now developed a high speed amphibian with a V hull having optimized on-land and on-water performance. The amphibian can plane on water, yet has on-road, off-road and utilitarian capability and is operable in two and/or four-wheel drive. This type of high speed amphibian further compounds the problems identified above since a greater ground clearance is required for off-road use and a bigger mass must be propelled up onto the plane. Surprisingly, this new amphibian capability has been achieved using a V hull according to the present invention. To this end, the applicant has gone against conventional thinking and overcome previous technical prejudices in arriving at the hull configuration according to the present invention.

In particular, the applicant has developed the shape and configuration of the front bow section of a hull to arrive at an optimized hull form for high speed amphibian use.

Accordingly, the present invention provides, in a first aspect, an amphibian operable in land and marine modes, the amphibian comprising:

a hull;

at least one discontinuity provided in the hull; and at least one of a retractable wheel assembly and a track drive assembly at least partially located in the at least one discontinuity, wherein:

at least one of a wheel and track drive of the at least one of the retractable wheel assembly and track drive assembly is retracted above a lowest point of the hull when operating in the marine mode, and at least part of the at least one of the wheel and track drive is protracted below the lowest point of the hull when operating in the land mode;

the hull is a planing V hull;

the hull has a forward bow section defining a frontal bow area across a beam of the hull;

the at least one discontinuity is provided in the forward bow section of the hull; and at least a portion of the at least one of the wheel and track drive of the at least one the retractable wheel assembly and track drive assembly is located ahead of and in front of at least a portion of the frontal bow area when protracted.

Preferably, at least a portion of the wheel or track drive of the at least one retractable wheel or track drive assembly is located ahead of and in front of at least a portion of the frontal bow surface/area when retracted.

Preferably, the forward bow section is formed by a central bow portion and port and starboard bow portions, each of central bow portion and port and starboard bow portions contributing to the frontal bow surface/area across a beam of the hull.

Preferably, at least a portion of each of the frontal bow surface/areas contributed by the port and starboard bow portions is spaced laterally from and to the rear of the frontal bow surface/areas contributed by the central bow portion.

Preferably, the portion of the wheel or track drive of the at least one retractable wheel or track drive assembly located ahead of and in front of the portion of the frontal bow surface/area when protracted is located ahead of and in front of the portion of the frontal bow surface/area contributed by the port or starboard bow portion.

Preferably, at least a portion of each of the frontal bow surface/areas contributed by the port and starboard bow portions are contoured such that the plane of each area/surface varies in at least one axis of that plane.

More preferably, at least a portion of each of the frontal bow surface/areas contributed by the port and starboard bow portions are contoured such that the plane of each area/ surface varies in at least two non coincident axes of that plane.

In a second aspect, the present invention provides an amphibian operable in land and marine modes, the amphibian comprising:

a hull;

at least one discontinuity provided in the hull; and at least one of a retractable wheel assembly and a track drive assembly at least partially located in the at least one discontinuity, wherein:

at least one of a wheel and a track drive of the at least one retractable wheel assembly and track drive assembly is retracted above a lowest point of the hull when operating in marine mode, and at least part of the at least one of the wheel and the track drive is protracted below the lowest point of the hull when operating in land mode, the hull is a planing V hull;

the hull has a forward bow section defining a frontal bow area across a beam of the hull;

the at least one discontinuity is provided in the forward bow section of the hull;

the forward bow section is formed by a central bow portion and port and starboard bow portions, each of the central bow portion and the port and starboard bow portions contributing to the frontal bow area across the beam of the hull;

at least a portion of each of the frontal bow areas contributed by the port and starboard bow portions is spaced laterally from and to the rear of the frontal bow areas contributed by the central bow portion; and at least a portion of each of the frontal bow areas contributed by the port and starboard bow portions are contoured such that a plane of each surface varies in at least one axis of that plane.

Preferably, the portions of each of the frontal bow surface/ areas contributed by the port and starboard bow portions are contoured such that the plane of each area/surface varies in at least two non coincident axes of that plane.

Preferably, at least a portion of the wheel or track drive of the at least one retractable wheel or track drive assembly is located ahead of and in front of at least a portion of the frontal bow surface/area when protracted.

Preferably, the portion of the wheel or track drive of the at least one retractable wheel or track drive assembly located ahead of and in front of the portion of the frontal bow surface/area when protracted is located ahead of and in front of the portion of the frontal bow surface/area contributed by the port or starboard bow portion.

Preferably, the frontal bow surface/areas FP or FS contributed by the port and starboard bow portions P, S is/are located behind the at least one discontinuity provided in the forward bow section of the hull.

Preferably, no part of the frontal bow surface/areas FP or FS contributed by the port and starboard bow portions P, S is/are located ahead of the at least one discontinuity provided in the forward bow section of the hull.

Preferably, more than 50% of the length of the hull has a dead rise angle in the range of 5 to 70 degrees, more preferably in the range of 10 to 50 degrees, and even more preferably in the range of 15 to 35 degrees.

Yet more preferably, more than 50% of the length of the hull has a dead rise angle of substantially 20 degrees.

Preferably, one or more jet drives or propellers are provided as a marine propulsion means.

Preferably, the one or more jet drives or propellers can propel the amphibian to a speed where sufficient hydrodynamic lift is generated to enable the vehicle to plane.

Preferably, the amphibian further comprises a four wheel drive or track drive powertrain which can be driven in two or four wheel drive or track drive.

These and other features, advantages and objects of the present invention will be further understood and appreciated by those skilled in the art by reference to the following specification, claims and appended drawings.

BRIEF DESCRIPTION OF THE DRAWINGS

Preferred embodiments of the present invention will now be described by way of example only with reference to the accompanying drawings, in which:

FIG. 11 is a further schematic perspective view from below and one side of the amphibian hull form of FIG. 1.

DETAILED DESCRIPTION OF PREFERRED EMBODIMENT

Figure 1:
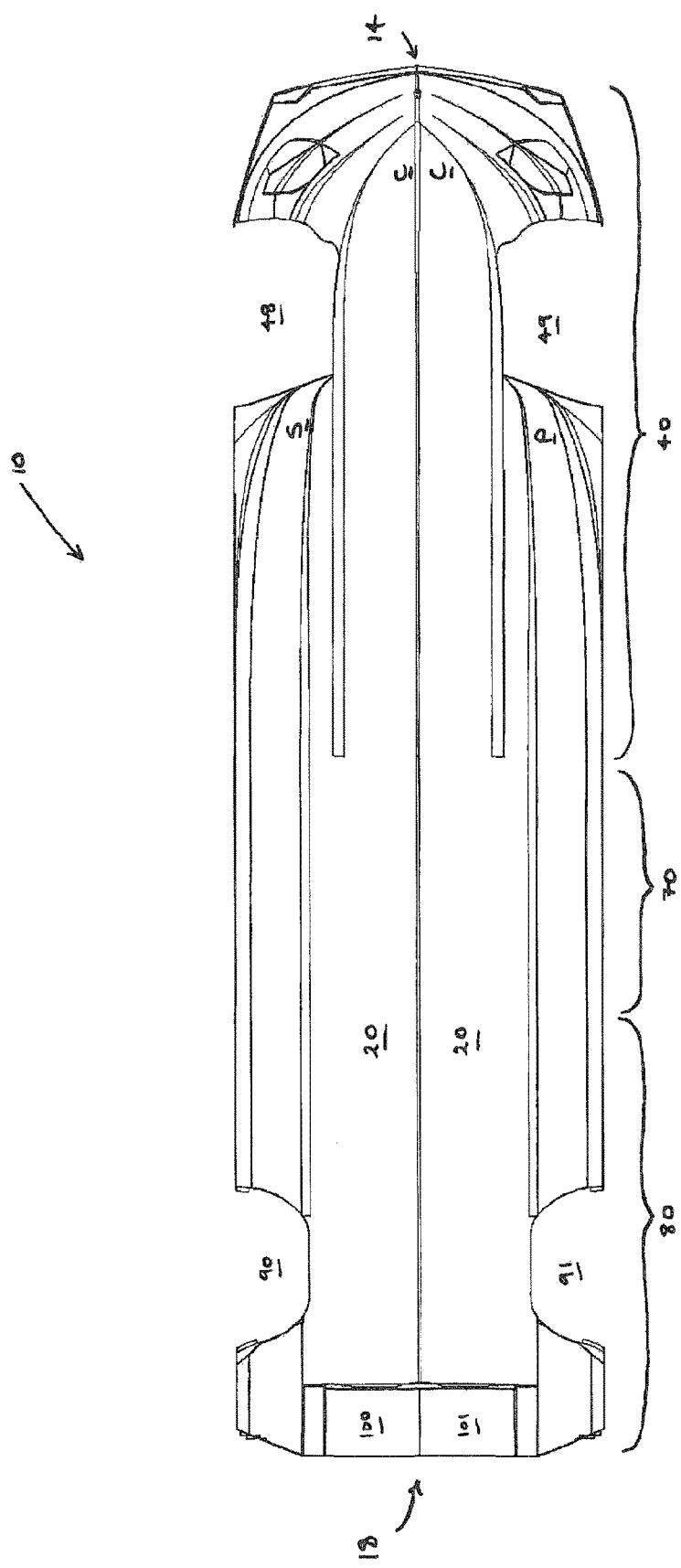
FIG. 1 is a schematic plan view from below of an amphibian hull according to the present invention.

Referring now to the Figures, there is shown an amphibian hull 10 comprising a forward bow section 40 and a rearward stern section 80. A midships section 70 extends between the forward bow section 40 and the rearward stern section 80. The respective lengths and/or proportions of the forward bow section 40, midships section 70 and the rearward stern section 80 shown in the context of the length of the hull 10 are indicative only and may be varied as appropriate. Provided on the underside of the hull 10 in the forward bow section 40 are a pair of discontinuities 48, 49 which serve as forward wheel arches. In the rear stern section 80 are provided a pair of discontinuities 90, 91 which serve as rear wheel arches. The wheel arches 48, 49, 90 and 91 do not form complete wheel arches which envelop the entire upper periphery of a wheel in the normal sense of a wheel arch for a road only going vehicle, but each does provide space to receive a retractable wheel assembly (shown schematically in FIG. 3, for example, by wheels 110, 112) which preferably includes a retractable suspension assembly. The wheels 110, 112 can each be moved between a protracted position, for use of the amphibian on land (including entry into and egress from the water), and a retracted position for use of the amphibian on water. The wheels 110, 112 may move into the retracted position to reduce drag when the amphibian is operated in water.

One or more jet drives or propellers (not shown) may be located in recesses 100, 101 at the rear of the hull 10, either in the centre of or offset from the centre line of the hull 10.

Figure 2:
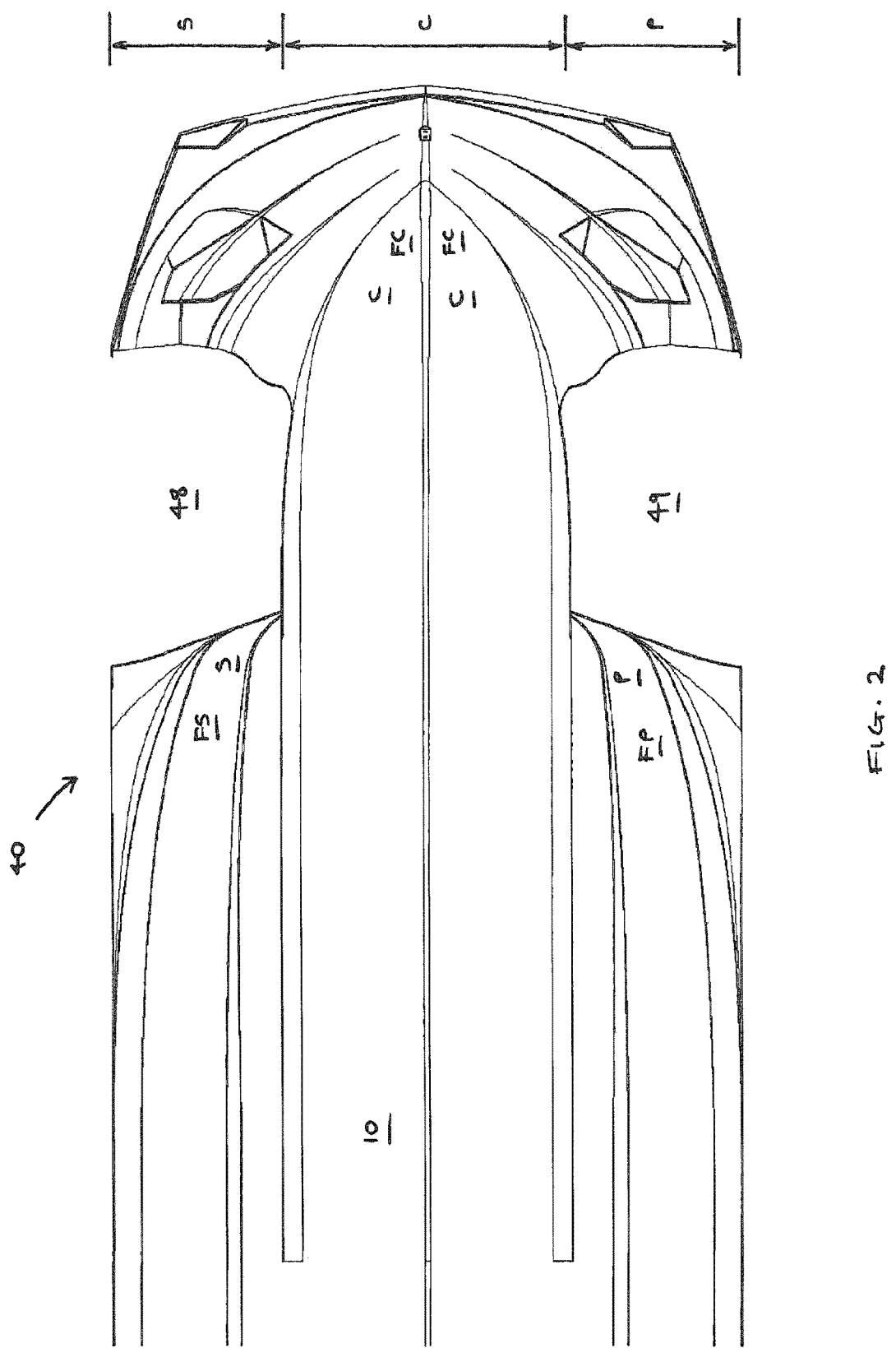
FIG. 2 is an enlarged detail view of the front bow section of the amphibian hull of FIG. 1.
Figure 4:
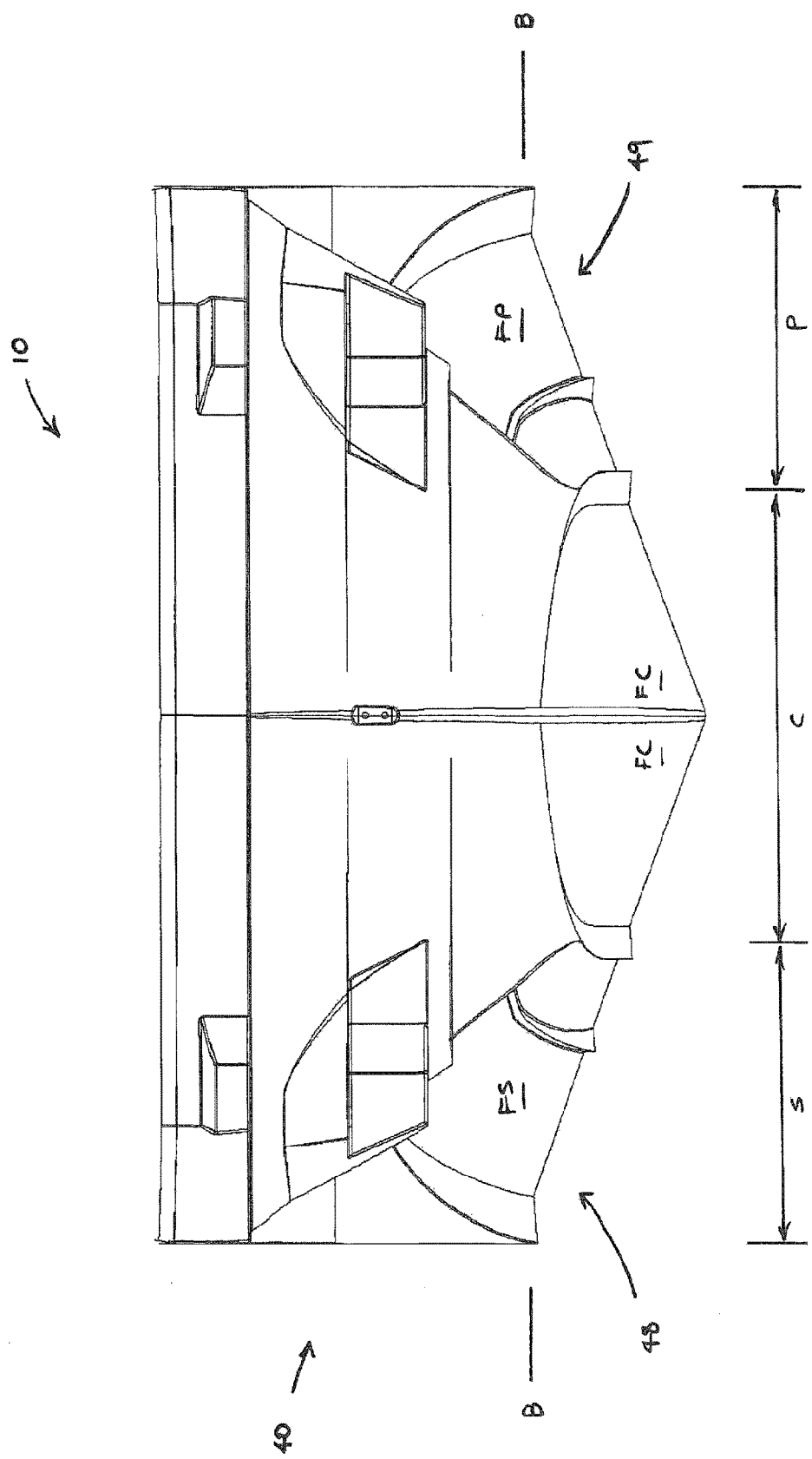
FIG. 4 is a schematic front elevation view of the bow section of the amphibian hull of FIG. 1.
Figure 7:
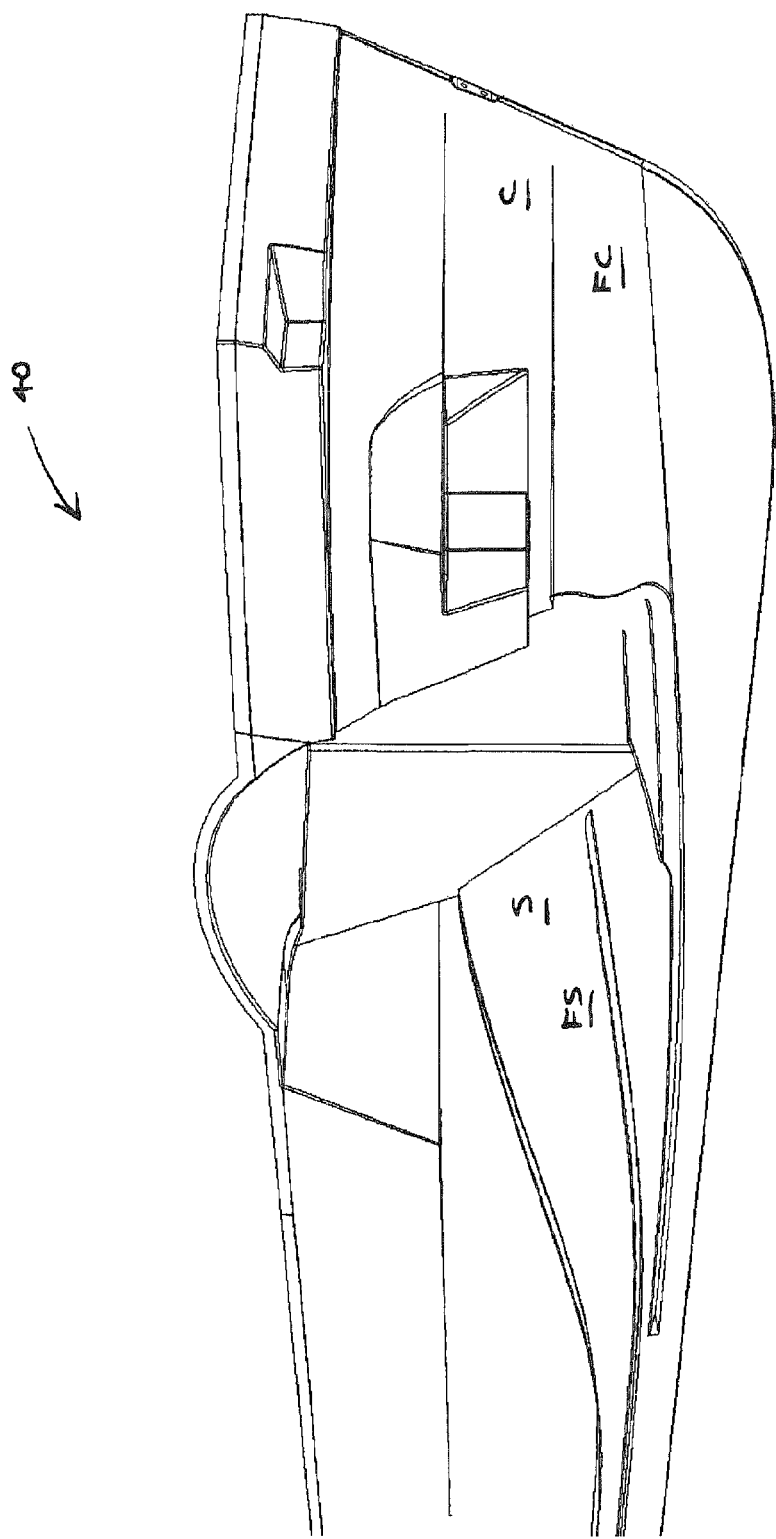
FIG. 7 is a schematic perspective view from below and one side of the front bow section of the amphibian hull of FIG. 1.

The hull 10 takes the form of a deep V planing hull. Such a hull 10 can be powered from standing where it is fully displaced to a speed where it can generate sufficient hydrodynamic lift to rise up out of the water and plane across the surface of the water. The hull 10 comprises a planing surface 20. The forward bow section 40 has a bespoke design to address the problems described above and experienced by introducing discontinuities (disruptions) in the hull 10 to accommodate the front wheel and suspension assemblies. With particular reference to FIGS. 2, 4 and 7, it can be seen that the forward bow section 40 of the hull 10 comprises a central bow portion C and port and starboard bow portions P, S. An indicative line B (shown for reference only in FIGS. 4 and 8) is used to illustrate the difference and transition in beam of the hull 10 at this line B between the bow 14 and the midships section 70. The central bow portion C extends further forward towards the bow 14 at the line B than the port and starboard bow portions P, S. The beam of the hull 10 at the line B increases between the bow 14 towards the midships section 70. Indeed, the developing beam of the hull 10 at the line B is such that the port and starboard bow portions P, S are provided behind the discontinuities 48, 49 which serve as forward wheel arches. The central bow portion C and port and starboard bow portions P, S are thus the frontal areas/surfaces of the hull which interface and interact with the water at the water line in the static, displacement and planing modes of operation, even on turning of the amphibian. The respective frontal areas/surfaces FC, FP and FS of each of the central bow portion C and port and the starboard bow portions P, S are contoured such that the plane of each area/surface varies in at least one axis of the plane. However, it is especially preferred that the plane of each area/surface varies in at least two non coincident axes of that plane. In particular, it is to be noted that there are no surface features in the frontal areas/surfaces FP and FS of each of the port and the starboard bow portions P, S which serve to cause drag when in contact with the water.

The hull 10 begins with very a steep dead rise angle at the bow 14 and this dead rise angle transitions through the length of the forward bow section 40 to a dead rise angle of some 20 degrees along a substantial part of the rest of the hull 10 towards the stern 18. Alternative dead rise angles may be employed. For example, a significant portion (more than 50%) of the length of the hull 10 will have a dead rise angle in the range of 5 to 70 degrees, more preferably in the range of 10 to 50 degrees, and even more preferably in the range of 15 to 35 degrees.

Figure 3:
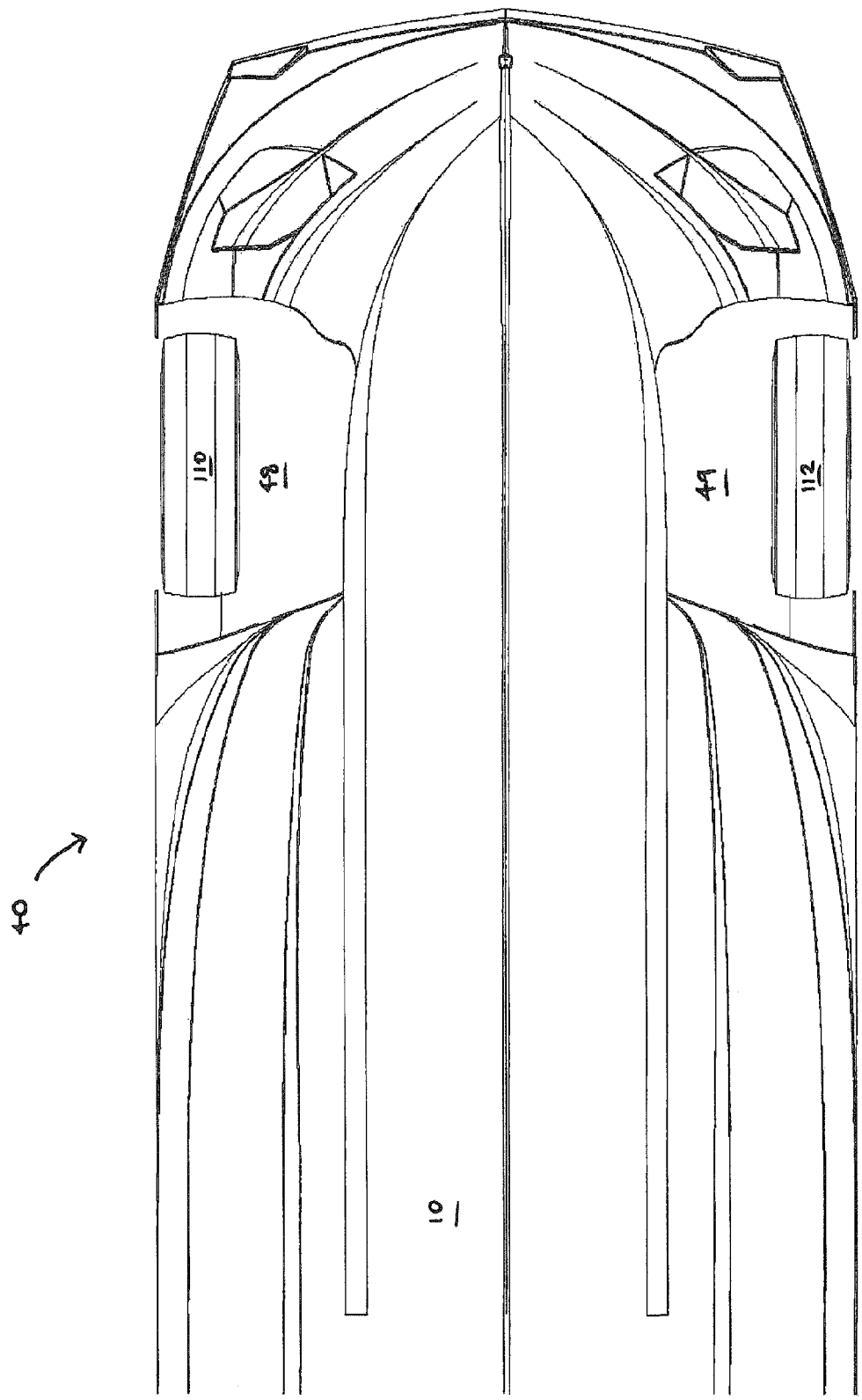
FIG. 3 is an enlarged detail view of the front bow section of the amphibian hull of FIG. 1 with front wheels shown schematically in a protracted position.
Figure 5:
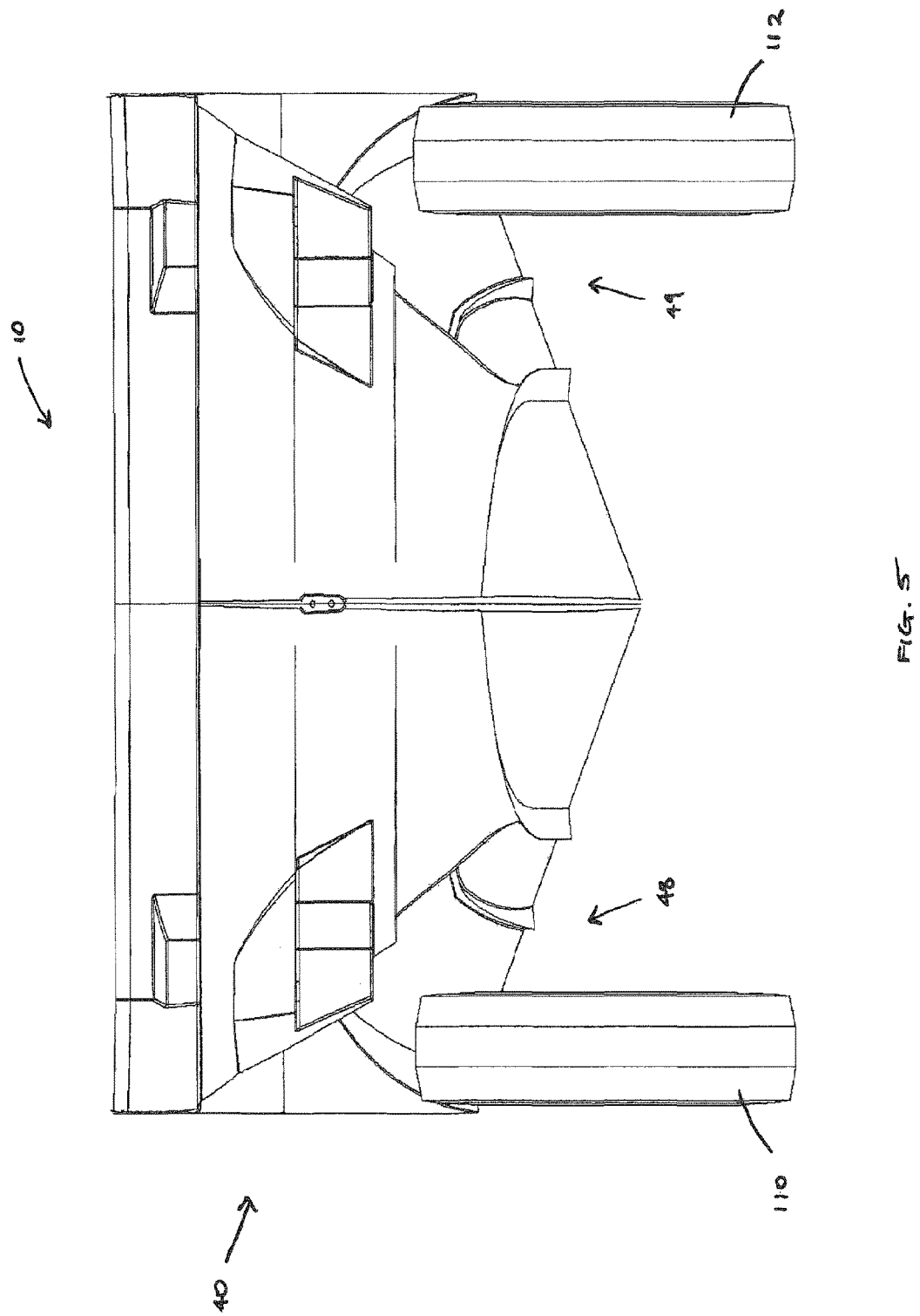
FIG. 5 is a schematic front elevation view of the bow section of the amphibian hull of FIG. 1 with front wheels shown schematically in a protracted position.
Figure 6:
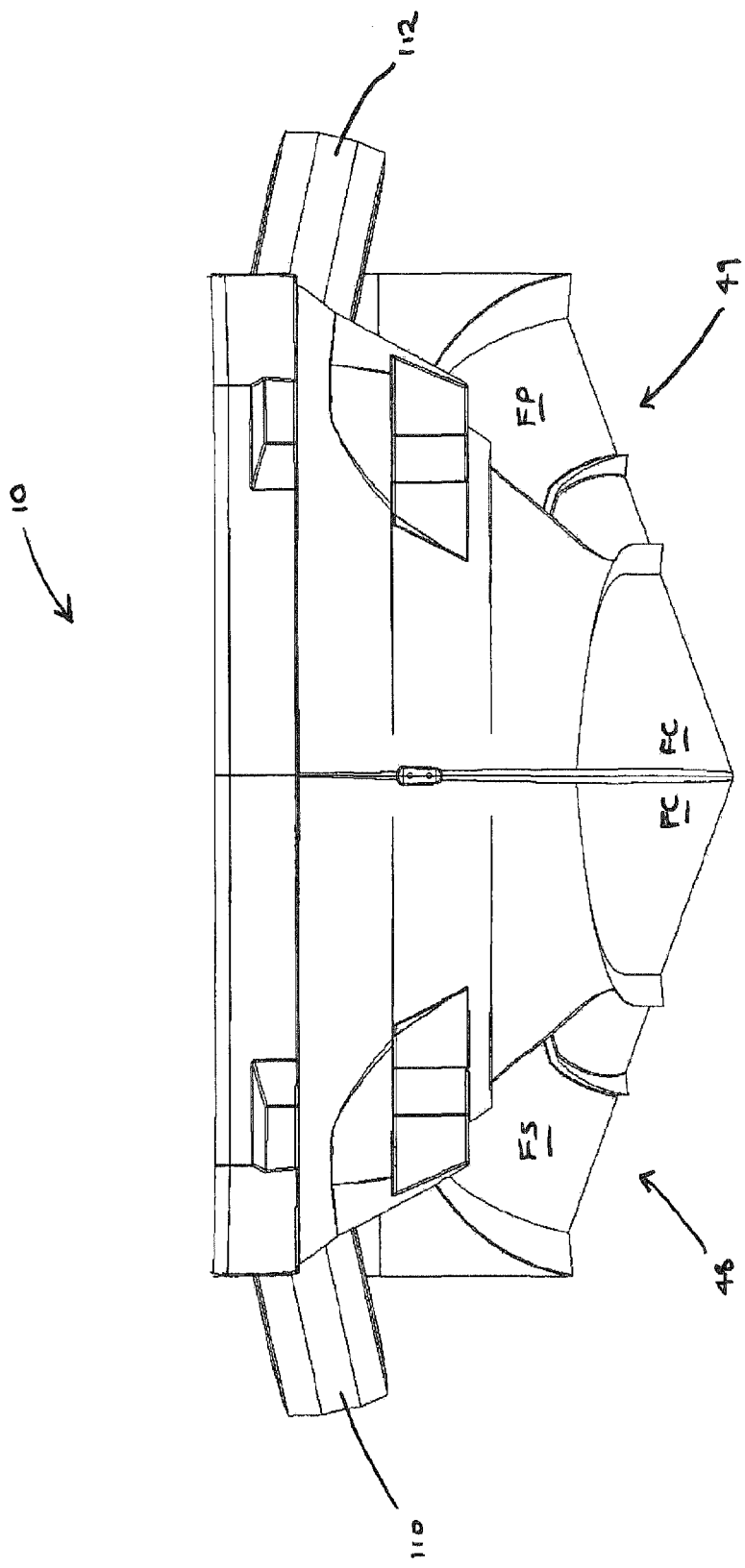
FIG. 6 is a schematic front elevation view of the bow section of the amphibian hull of FIG. 1 with front wheels shown schematically in a retracted position.
Figure 8:
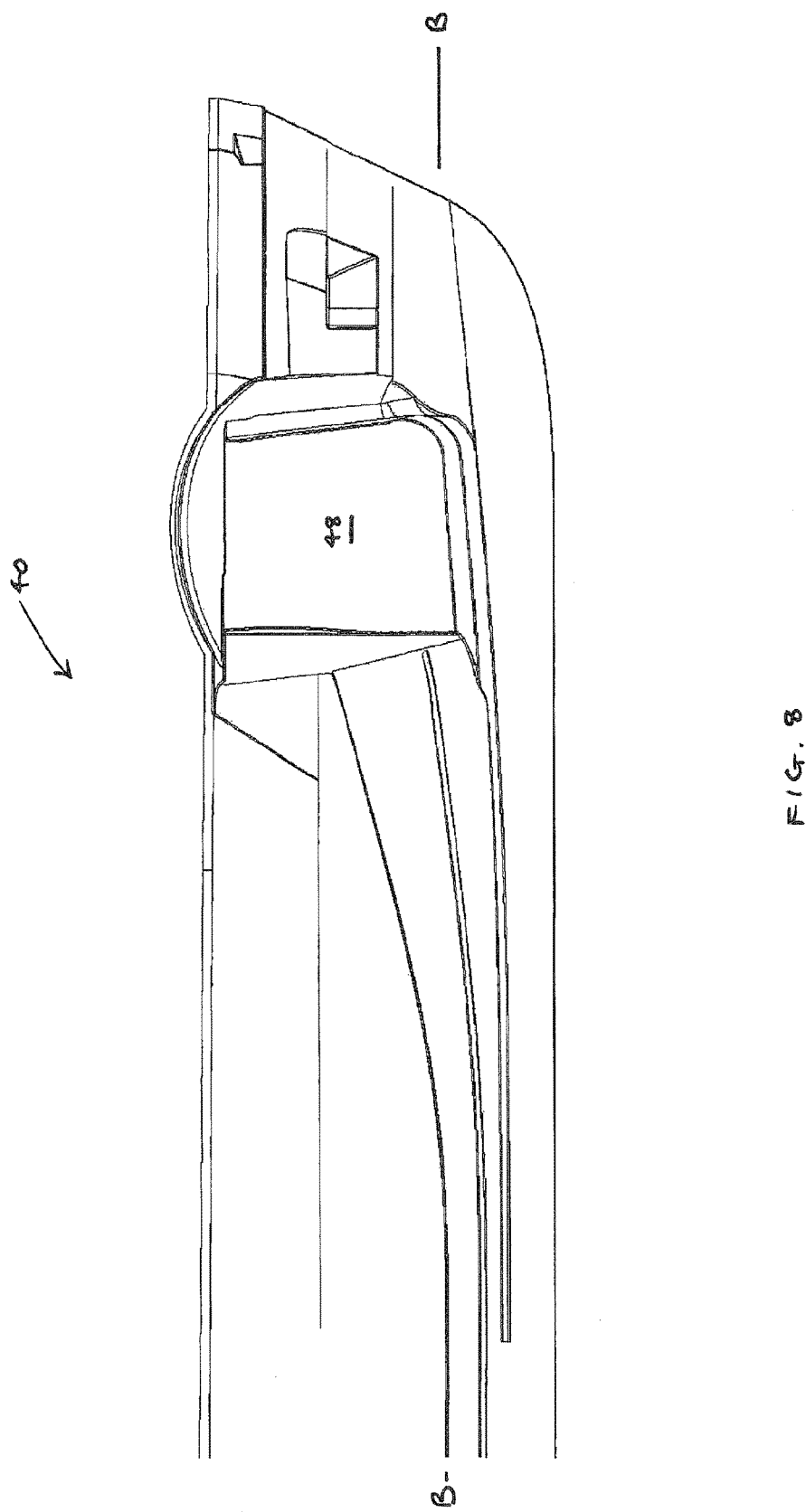
FIG. 8 is a schematic side elevation view of the front bow section of the amphibian hull of FIG. 1.
Figure 9:
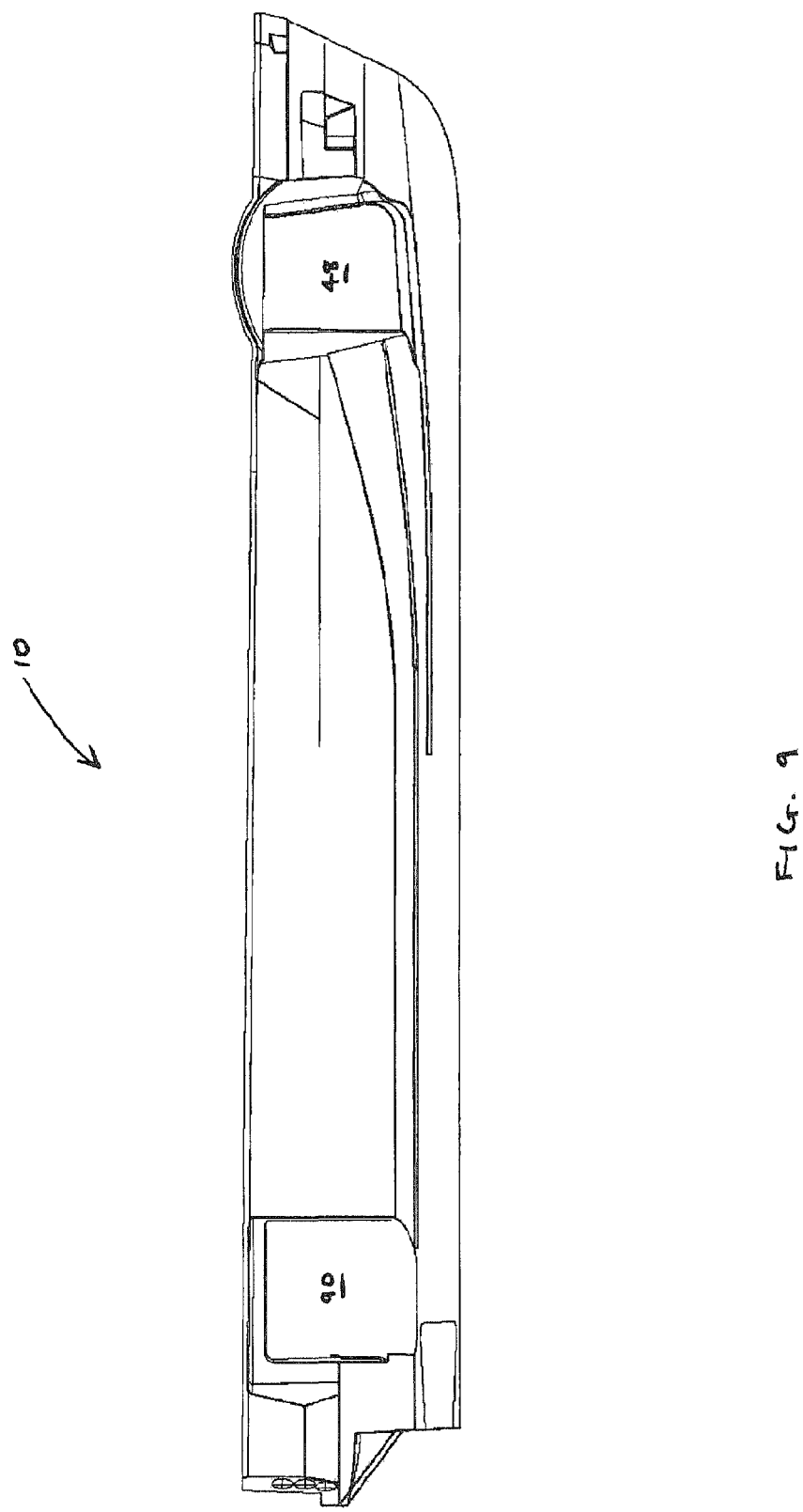
FIG. 9 is a schematic side elevation view of the amphibian hull of FIG. 1.
Figure 10:
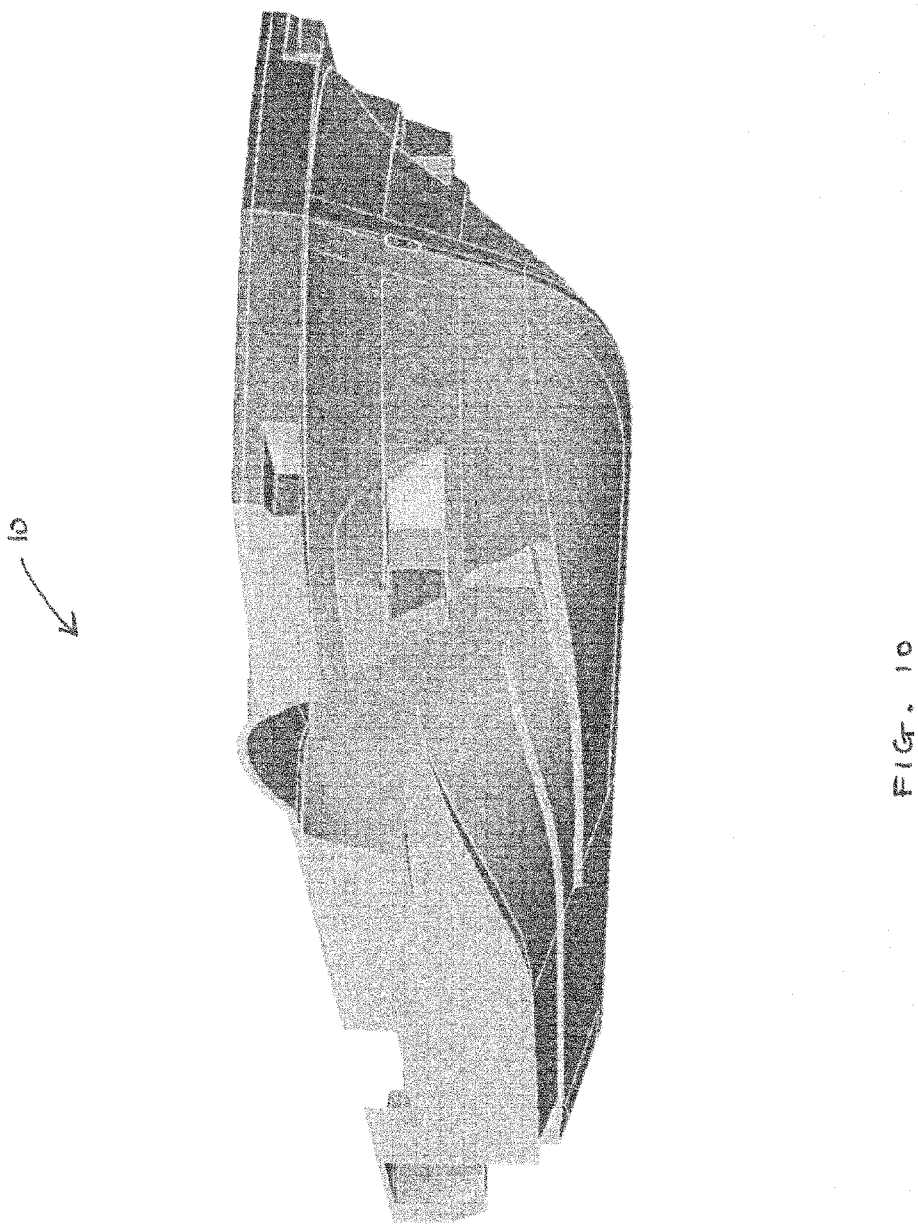
FIG. 10 is a schematic perspective view from below and one side of the amphibian hull form of FIG. 1.

With particular reference to FIG. 1, there is shown a schematic plan view from below of the hull 10 according to the present invention. For reasons of clarity, no wheels, suspension, powertrain or marine propulsion is shown. FIG. 2 is an enlarged detail view of the front bow section 40 of the hull 10, again with no wheels, suspension, powertrain or marine propulsion shown. FIG. 3 differs from FIG. 2 in that front wheels 110, 112 are shown schematically in a protracted position in discontinuities 48, 49 which serve as forward wheel arches. FIG. 4 is a schematic front elevation view of the bow section of the hull 10 and illustrates the central bow portion C and port and starboard bow portions P, S and their respective frontal areas/surfaces FC, FP and FP which interface and interact with the water at the water line in the static, displacement and planing modes of operation. FIG. 5 differs from FIG. 4 in that front wheels 110, 112 are shown schematically in a protracted position in discontinuities 48, 49. FIG. 6 shows the front wheels 110, 112 schematically in a protracted position in discontinuities 48, 49. FIG. 7 is a schematic perspective view from below and one side of the front bow section 40 of the hull 10, while FIG. 8 is a schematic side elevation view of the front bow section 40. FIGS. 9 and 10 schematically illustrate the surface hull form.

In order for the amphibian to make the transition from its hull 10 being in displacement mode to one where it is planing, the through water speed of the amphibian must be increased to achieve the necessary hydrodynamic lift. The V hull and frontal bow section 40 is key in reducing the drag of the hull 10 and facilitating the necessary gain in speed of the amphibian through the water. Once on the plane, the V of the hull 10 provides directional stability. However, the V of the hull may be supplemented with conventional strakes or strakes as discussed in the applicant's UK patent no. GB2401833B.

Whilst wheels have been described throughout as the land propulsion means, track drives or individual track drives (i.e. to replace a single wheel) may be used as an alternative or in combination with wheels.

Each feature disclosed in this specification (including the accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. In addition, all of the features disclosed in this specification (including the accompanying claims, abstract and drawings), and/or all of the steps of any method or process so disclosed, may be combined in any combination, except combinations where at least some of such features and/or steps are mutually exclusive. Accordingly, while different embodiments of the present invention have been described above, any one or more or all of the features described, illustrated and/or claimed in the appended claims may be used in isolation or in various combinations in any embodiment. As such, any one or more feature may be removed, substituted and/or added to any of the feature combinations described, illustrated and/or claimed. For the avoidance of doubt, any one or more of the features of any embodiment may be combined and/or used separately in a different embodiment with any other feature or features from any of the embodiments.

Whereas the present invention has been described in relation to what is presently considered to be the most practical and preferred embodiments, it is to be understood that the invention is not limited to the disclosed arrangements but rather is intended to cover various modifications and equivalent constructions included within the scope of the appended claims.

The invention claimed is:

1. An amphibian operable in land and marine modes, the amphibian comprising:
    a hull;
    at least one discontinuity provided in the hull; and
    at least one of a retractable wheel assembly and a track drive assembly at least partially located in the at least one discontinuity, wherein:
    at least one of a wheel and track drive of the at least one of the retractable wheel assembly and track drive assembly is retracted above a lowest point of the hull when operating in the marine mode, and at least part of the at least one of the wheel and track drive is protracted below the lowest point of the hull when operating in the land mode;
the hull is a planing V hull;
the hull has a forward bow section defining a frontal bow area across a beam of the hull;
the at least one discontinuity is provided in the forward bow section of the hull; and
at least a portion of the at least one of the wheel and track drive of the at least one the retractable wheel assembly and track drive assembly is located ahead of and in front of at least a portion of the frontal bow area when protracted.

2. The amphibian as claimed in claim 1, wherein the at least portion of the at least one of the wheel and track drive of the at least one of the retractable wheel assembly and the track drive assembly is located ahead of and in front of the at least portion of the frontal bow area when retracted.

3. The amphibian as claimed in claim 1, wherein the forward bow section is formed by a central bow portion and port and starboard bow portions, each of the central bow portion and the port and starboard bow portions contributing to the frontal bow area across the beam of the hull.

4. The amphibian as claimed in claim 3, wherein at least a portion of each of the frontal bow areas contributed by the port and starboard bow portions is spaced laterally from and to the rear of the frontal bow areas contributed by the central bow portion.

5. The amphibian as claimed in claim 3, wherein the at least portion of the at least one of the wheel and the track drive of the at least one of the retractable wheel assembly and the track drive assembly located ahead of and in front of the portion of the frontal bow area when protracted is located ahead of and in front of the portion of the frontal bow area contributed by at least one of the port bow portion and the starboard bow portion.

6. The amphibian as claimed in claim 3, wherein at least a portion of each of the frontal bow areas contributed by the port and starboard bow portions are contoured such that a plane of each surface varies in at least one axis of that plane.

7. The amphibian as claimed in claim 3, wherein at least a portion of each of the frontal bow areas contributed by the port and starboard bow portions are contoured such that a plane of each surface varies in at least two non coincident axes of that plane.

8. The amphibian as claimed in claim 3, wherein no part of the frontal bow areas contributed by the port and starboard bow portions is located ahead of and in front of the at least a portion of the at least one of the wheel and the track drive when retracted.

9. The amphibian as claimed in claim 3, wherein the frontal bow areas contributed by the port and starboard bow portions are located behind the at least one discontinuity provided in the forward bow section of the hull.

10. The amphibian as claimed in claim 3, wherein no part of the frontal bow areas contributed by the port and starboard bow portions are located ahead of the at least one discontinuity provided in the forward bow section of the hull.

11. The amphibian as claimed in claim 3, further comprising at least one of a four wheel drive and a track drive powertrain which can be driven in at least one of two wheel drive, four wheel drive and track drive.

12. An amphibian operable in land and marine modes, the amphibian comprising:
a hull;
at least one discontinuity provided in the hull; and
at least one of a retractable wheel assembly and a track drive assembly at least partially located in the at least one discontinuity, wherein:
at least one of a wheel and a track drive of the at least one retractable wheel assembly and track drive assembly is retracted above a lowest point of the hull when operating in marine mode, and at least part of the at least one of the wheel and the track drive is protracted below the lowest point of the hull when operating in land mode,
the hull is a planing V hull;
the hull has a forward bow section defining a frontal bow area across a beam of the hull;
the at least one discontinuity is provided in the forward bow section of the hull;
the forward bow section is formed by a central bow portion and port and starboard bow portions, each of the central bow portion and the port and starboard bow portions contributing to the frontal bow area across the beam of the hull;
at least a portion of each of the frontal bow areas contributed by the port and starboard bow portions is spaced laterally from and to the rear of the frontal bow areas contributed by the central bow portion; and
at least a portion of each of the frontal bow areas contributed by the port and starboard bow portions are contoured such that a plane of each surface varies in at least one axis of that plane.

13. The amphibian as claimed in claim 12, wherein the portions of each of the frontal bow areas contributed by the port and starboard bow portions are contoured such that the plane of each surface varies in at least two non coincident axes of that plane.

14. The amphibian as claimed in claim 12, wherein at least a portion of the at least one of the wheel and the track drive of the at least one of the retractable wheel assembly and the track drive assembly is located ahead of and in front of at least a portion of the frontal bow area when protracted.

15. The amphibian as claimed in claim 14, wherein the portion of the at least one of the wheel and the track drive of the at least one of the retractable wheel assembly and the track drive assembly located ahead of and in front of the portion of the frontal bow area when protracted is located ahead of and in front of the portion of the frontal bow area contributed by at least one of the port now portion and the starboard bow portion.

16. The amphibian as claimed in claim 12, wherein more than 50% of a length of the hull has a dead rise angle in the range of between about 5 and about 70 degrees.

17. The amphibian as claimed in claim 12, further comprising at least one of a jet drive and propellers.

18. The amphibian as claimed in claim 17, wherein the at least one of the jet drive and the propellers can propel the amphibian to a speed where sufficient hydrodynamic lift is generated to enable the amphibian to plane.

* * * * *